(12) United States Patent
Unnebrink et al.

(10) Patent No.: US 7,720,803 B2
(45) Date of Patent: May 18, 2010

(54) MAPPING OF A TRANSACTIONAL DATA MODEL TO A REPORTING DATA MODEL

(75) Inventors: Stefan Unnebrink, Neckargemuend (DE); Roman Moehl, Mannheim (DE)

(73) Assignee: SAP AG, Walldorf (DE)

( * ) Notice: Subject to any disclaimer, the term of this patent is extended or adjusted under 35 U.S.C. 154(b) by 224 days.

(21) Appl. No.: 11/392,327

(22) Filed: Mar. 28, 2006

(65) Prior Publication Data

US 2007/0239711 A1    Oct. 11, 2007

(51) Int. Cl.
G06F 7/00    (2006.01)
(52) U.S. Cl. .................... 707/601; 715/210
(58) Field of Classification Search ............... 707/101, 707/102, 103 R, 103 Y, 103 Z
See application file for complete search history.

(56) References Cited

U.S. PATENT DOCUMENTS

| | | | | |
|---|---|---|---|---|
| 5,832,496 A * | 11/1998 | Anand et al. | ............ | 707/102 |
| 6,175,837 B1 * | 1/2001 | Sharma et al. | ............ | 707/103 Y |
| 6,718,320 B1 * | 4/2004 | Subramanian et al. | ...... | 707/100 |
| 7,191,183 B1 * | 3/2007 | Goldstein | ............ | 707/101 |
| 2002/0035562 A1 * | 3/2002 | Roller et al. | ............ | 707/6 |
| 2002/0116389 A1 * | 8/2002 | Chen et al. | ............ | 707/103 R |
| 2003/0061096 A1 * | 3/2003 | Gallivan et al. | ............ | 705/14 |
| 2004/0111346 A1 * | 6/2004 | Macbeath et al. | ............ | 705/35 |
| 2004/0181440 A1 * | 9/2004 | Yeh et al. | ............ | 705/7 |
| 2004/0181538 A1 * | 9/2004 | Lo et al. | ............ | 707/100 |
| 2004/0236786 A1 * | 11/2004 | Medicke et al. | ............ | 707/104.1 |
| 2005/0033726 A1 * | 2/2005 | Wu et al. | ............ | 707/1 |
| 2005/0050068 A1 * | 3/2005 | Vaschillo et al. | ............ | 707/100 |
| 2006/0064428 A1 * | 3/2006 | Colaco et al. | ............ | 707/101 |
| 2006/0117057 A1 * | 6/2006 | Legault et al. | ............ | 707/102 |
| 2006/0200482 A1 * | 9/2006 | Tan | ............ | 707/102 |

* cited by examiner

*Primary Examiner*—Pierre M Vital
*Assistant Examiner*—Augustine Obisesan
(74) *Attorney, Agent, or Firm*—Mintz, Levin, Cohn, Ferris, Glovsky & Popeo, P.C.

(57) ABSTRACT

Systems and techniques for mapping of a transactional data model to a reporting data model are described. In one aspect, an article includes one or more machine-readable media storing instructions operable to cause one or more machines to perform operations. The operations include receiving a transactional data model and a view that includes a collection of view fields, each view field referencing an object in the transactional data model, mapping one or more of a plurality of view fields in the collection to one or more of a plurality of data warehouse objects, and grouping the mapped data warehouse objects into a reporting data model.

15 Claims, 12 Drawing Sheets

| Businesspartner | | | |
|---|---|---|---|
| BusinessPartnerID | Name | Country | OrganisationName |
| BusinessPartner/ BusinessPartner/ BusinessPartnerID | BusinessPartner/ BusinessPartner/ Name | BusinessPartner/ BusinessPartner/ Country | BusinessPartner/ BusinessPartner/ Organization/ |
| ... | ... | ... | ... |

FIG. 3

| Material | | |
|---|---|---|
| MaterialID | MaterialGroup | Price |
| Material/ Material/ MaterialID | Material/ Material/ MaterialGroup | Material/ Material/ Price |
| ... | ... | ... |

FIG. 4

| SalesOrder | | | | | | | |
|---|---|---|---|---|---|---|---|
| HeaderID | CustomerID | SalesPersonID | Date | PositionID | MaterialID | Quantity | TaxPerPosition |
| SalesOrder/ Header/ HeaderID | SalesOrder/ Header/ CustomerID | SalesOrder/ Header/ SalesPersonID | SalesOrder/ Header/ Date | SalesOrder/ Position/ PositionID | SalesOrder/ Position/ MaterialID | SalesOrder/ Position/ Quantity | SalesOrder/ Position_calc/ TaxPerPos |
| ... | ... | ... | ... | ... | ... | ... | ... |

FIG. 5

| Businesspartner | | | |
|---|---|---|---|
| BusinessPartnerID | Name | Country | OrganisationName |
| BusinessPartner/ BusinessPartner/ BusinessPartnerID | BusinessPartner/ BusinessPartner/ Name | BusinessPartner/ BusinessPartner/ Country | BusinessPartner/ Organisation/ Name |
| ... | ... | ... | ... |

| Material | | |
|---|---|---|
| MaterialID | MaterialGroup | Price |
| Material/ Material/ MaterialID | Material/ Material/ MaterialGroup | Material/ Material/ Price |
| ... | ... | ... |

| HeaderID | CustomerID | SalesPersonID | Date | PositionID | MaterialID | Quantity | TaxPerPosition |
|---|---|---|---|---|---|---|---|
| SalesOrder/ Header/ HeaderID | SalesOrder/ Header/ CustomerID | SalesOrder/ Header/ SalesPersonID | SalesOrder/ Header/ Date | SalesOrder/ Position/ PositionID | SalesOrder/ Position/ MaterialID | SalesOrder/ Position/ Quantity | SalesOrder/ Position_calc/ TaxPerPos |
| ... | ... | ... | ... | ... | ... | ... | ... |

SalesOrder

- 1505, 1510, 1515 (row labels)
- 1520, 1525, 1530, 1535, 1540, 1545, 1550, 1555 (column labels)

| Invoicenumber | CustomerID | Date | PositionID | MaterialID | Quantity | TotalGrossAmount | TotalNetAmount |
|---|---|---|---|---|---|---|---|
| Invoice/ InvoiceHeader/ Invoicenumber | Invoice/ InvoiceHeader/ CustomerID | Invoice/ InvoiceHeader/ Date | Invoice/ InvoicePosition/ PositionID | Invoice/ InvoicePosition/ MaterialID | Invoice/ InvoicePosition/ Quantity | Invoice/ InvoicePosition/ TotalGrossAmount | Invoice/ InvoicePosition/ TotalNetAmount |
| ... | ... | ... | ... | ... | ... | ... | ... |

Invoice

- 1605, 1610, 1615 (row labels)
- 1620, 1625, 1630, 1635, 1640, 1645, 1650, 1655 (column labels)

MAPPING OF A TRANSACTIONAL DATA MODEL TO A REPORTING DATA MODEL

BACKGROUND

This disclosure relates to mapping of a transactional data model to a reporting data model.

The storage of information by a machine can be tailored for operational efficiency and effectiveness in different contexts. Such tailoring is often achieved by using different data models in the different contexts. A data model is the logical and physical structure of a data store, and can include the physical storage parameters needed to implement a design.

Contexts for which data models can be tailored include data analysis, data modification, and/or size minimization. For example, transactional data models are generally tailored to facilitate modification of the stored data. In this regard, transactional data models generally ensure that modifications can be made quickly by using relatively small data storage structures that can be modified independently of other transactional data structures. A relatively small data storage structure is one that is comparable in size to the largest common change transaction. A change transaction is a transaction in which the stored data content is added, deleted, or otherwise changed. A transactional data model can thus include individual data objects that are comparable in size to common changes to content. For example, a transactional data model can include individual data objects that correspond to individual sales orders in a business, individual customers, and/or individual products.

As another example, reporting data models are generally tailored to facilitate analysis and/or reporting of stored data. In this regard, reporting data models generally ensure that large amounts of stored data can be accessed quickly and easily by using relatively large data storage structures. Also, reporting data models can be structured so that portions of the data model only include numeric data. Any exhaustive or near-exhaustive searching can thus be performed rapidly on this numeric data. A reporting data model can be several hundred or more times the size of common change transactions. For example, a reporting data model can be a relational database such as a common warehouse metamodel (CWM) star schema that includes objects which store data regarding several thousand, million, or billion sales orders, customers, and/or products.

The mapping of data models facilitates the rearrangement of information that has been stored in different data models. Mapping can include establishing a protocol or a set of directions for rearranging stored information and/or the actual process of rearranging stored information from one data model to another.

SUMMARY

Systems and techniques for mapping of a transactional data model to a reporting data model are described. In one aspect, an article includes one or more machine-readable media storing instructions operable to cause one or more machines to perform operations. The operations include receiving a transactional data model and a view that includes a collection of view fields, each view field referencing an object in the transactional data model, mapping one or more of a plurality of view fields in the collection to one or more of a plurality of data warehouse objects, and grouping the mapped data warehouse objects into a reporting data model.

This and other aspects can include one or more of the following features. The individual view fields can be mapped by mapping at least some of the individual view fields based on existing references to objects in the transactional data model. The individual view fields can be mapped by determining if an existing data warehouse object references a first object in the transactional data model, wherein the first object is also referenced by a first view field, and mapping the first view field to the existing data warehouse object.

The individual view fields can be mapped by determining if a second field in a second view references a first object in the transactional data model, and mapping the first view field to the existing data warehouse object. The first object is also referenced by the first view field and the second field is already mapped to an existing data warehouse object.

The individual view fields can be mapped by creating a new data warehouse object, and mapping at least some of the individual view fields to the new data warehouse object. The individual view fields can be mapped by determining that a first view field is numeric. A new data warehouse object can be created by creating a new measure object. At least some of the individual view fields can be mapped by mapping the first view field to the new measure object.

The individual view fields can be mapped by determining that a first view field is not numeric. A new data warehouse object can be created by creating a new dimension object. At least some of the individual view fields can be mapped by mapping the first view field to the new dimension object. A new data warehouse object can also be created by creating a new dimension view object. The transactional data model can include a collection of objects that are comparably sized to common change transactions and the reporting data model can include a star schema.

In another aspect, a computer-implemented method include receiving a transactional data model and a view that includes a collection of view fields, selecting a first view field from the collection, determining whether a second object in the transactional data model is associated with the first object, creating a dimension view object in response to determining that the second object in the transactional data model is associated with the first object, and mapping the first view field to the dimension view object. The first view field references a first object in the transactional data model. The dimension view object is to join a first of the two or more measures to a single class of dimension object in a reporting data model.

This and other aspects can include one or more of the following features. The dimension view object can include relationship information that identifies a relationship between the first of the two or more measures and a dimension object. The dimension view object can be created by determining if there is an existing dimension object that references the associated transactional object.

The method can also include responding to a determination that there is an existing dimension object that references the associated transactional object by creating the new dimension view object to characterize the existing dimension object. The method can also include responding to a determination that there is no existing dimension object references the associated transactional object by creating a new dimension object with a reference to the associated transactional object and creating the new dimension view object to characterize the new dimension object.

The method can also include selecting a second view field from the collection, wherein the second view field references a second object in the transactional data model. The first view field can reference one of an attribute, a method, an interface, and a relationship of the first object. The first view field can always be a numeric field.

DESCRIPTION OF DRAWINGS

FIGS. 3-5 are schematic representations of views.

FIGS. 13-16 are schematic representations of views.

Like reference symbols in the various drawings indicate like elements.

DETAILED DESCRIPTION

Figure 1:
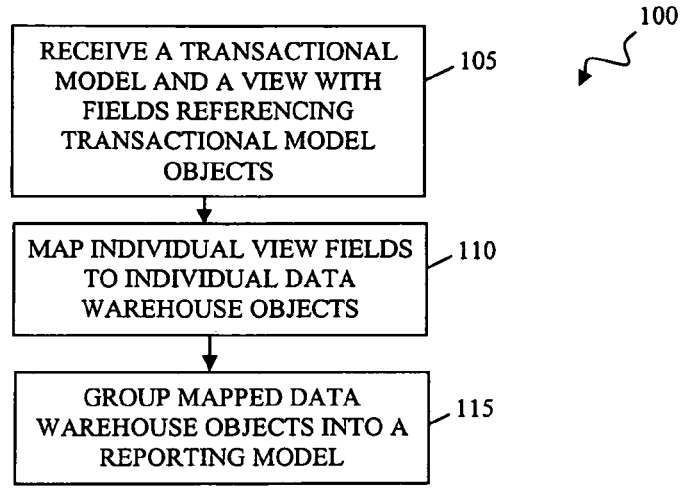
FIG. 1 is a flowchart of a process for mapping of a transactional data model to a reporting data model.

FIG. 1 is flowchart of a process 100 for mapping of a transactional data model to a reporting data model. Process 100 can be performed by a data processing system that performs the data processing activities of process 100 in accordance with the logic of a set of machine-readable instructions. The data processing system can include one or more devices and/or one or more applications, some or all of which perform activities that contribute to the performance of process 100.

The system that performs process 100 receives a transactional data model and a view that includes fields referencing objects in the transactional data model at 105. A view is a collection of fields. A view assembles multiple fields of a complex data structure (such as, e.g., a transactional object) into a flat data structure. A view can include a subset of the data in the complex data structure in the flat data structure.

A view can be derived from a transactional data model that describes the attributes, methods, interfaces, and relationships of a collection of objects so that data from the various objects can be visually displayed for a user. The fields in a view can reference particular objects, the attributes of particular objects, or relationships of particular objects in a transactional data model from which information in the view field is derived. Such references can be, e.g., a name, a pointer, or other information that identifies an object or the attributes or relationships of an object.

An object is a collection of information that is grouped together and treated as a primitive in a data processing system. An object is generally free of internal references and information stored in an object can be changed without concomitant changes to the data processing instructions that handle the object. The information in an object can be stored in a contiguous block of computer memory of a specific size at a specific location.

Objects can represent a concrete or abstract real-world entity. An object can be of a certain object type, with individual objects being instances of that type. The entities represented by an object can include, e.g., a set of data processing instructions (such as a program), a data structure (such as a table), individual entries in a data structure (such as a record in a table), a data processing system, a customer, a product, a time, or a location. In a transactional data model, objects can be tailored to facilitate modification of the data stored in an object. For example, objects can be sized comparably to the largest common change transaction on the model.

The system that performs process 100 maps individual fields in the view to individual data warehouse objects at 110. A data warehouse is a collection of information stored in a reporting data model. In this regard, a data warehouse is generally a collection of a recorded transactional information that is stored in a data model tailored for data analysis and reporting. Example data warehouses include star schema, such as those meeting Common Warehouse Metadata (CWM) standards, Open Information Model standards, and the SAP BW Star Schema (SAP AG, Walldorf, Germany).

Data warehouse objects are constituent objects of a data warehouse. In the context of a star schema data warehouse, data warehouse objects generally include two different classes of data warehouse objects. The first class, referred to herein as "measure objects," can be used to build a fact table in a star schema. Measure objects can be used to store measures (also known as "measurements," "metrics," "keyfigures," and/or "facts").

The second class, referred to herein as "dimension objects," can be used to build dimension or other tables (other than a fact table) in a star schema. Dimension objects can include characteristics (also known as "dimensions") that describe aspects of the measures in a fact table or aspects of the characteristics in other dimension objects. Thus, dimension objects can be used to form different varieties of star schema, such as snowflake schema. Example dimension objects include dimension tables, dimension view objects, and the like. Dimension view objects are objects which are a view on a second dimension object. Through the use of dimension view objects, such second dimension objects can be used in a variety of different roles in a data warehouse. Other types of dimension objects include, e.g., surrogate identification (SID) objects, text objects, hierarchy objects, and the like, such as found in the SAP BW Star Schema in SAP BW (SAP AG, Walldorf, Germany).

In order to map individual fields in a view to individual data warehouse objects, the system performing process 100 can store the identity of each individual view field in association with the identity of a data warehouse object in a data structure. For example, a data table can identify the view fields and the associated data warehouse objects in a pair of columns. Such a data structure can be used to implement a mapping protocol for rearranging data in the view fields into the associated data warehouse objects.

The system that performs process 100 can group the mapped data warehouse objects into a reporting data model at 115. For example, in the context of a star schema, measure objects can be assembled in a fact table and dimension objects can joined to the fact table as dimension tables. The reporting data model can store large amounts of typically numeric data for quick and easy access. The amount of data can be several hundred or thousand times the size of a typical change transaction.

Figure 2:
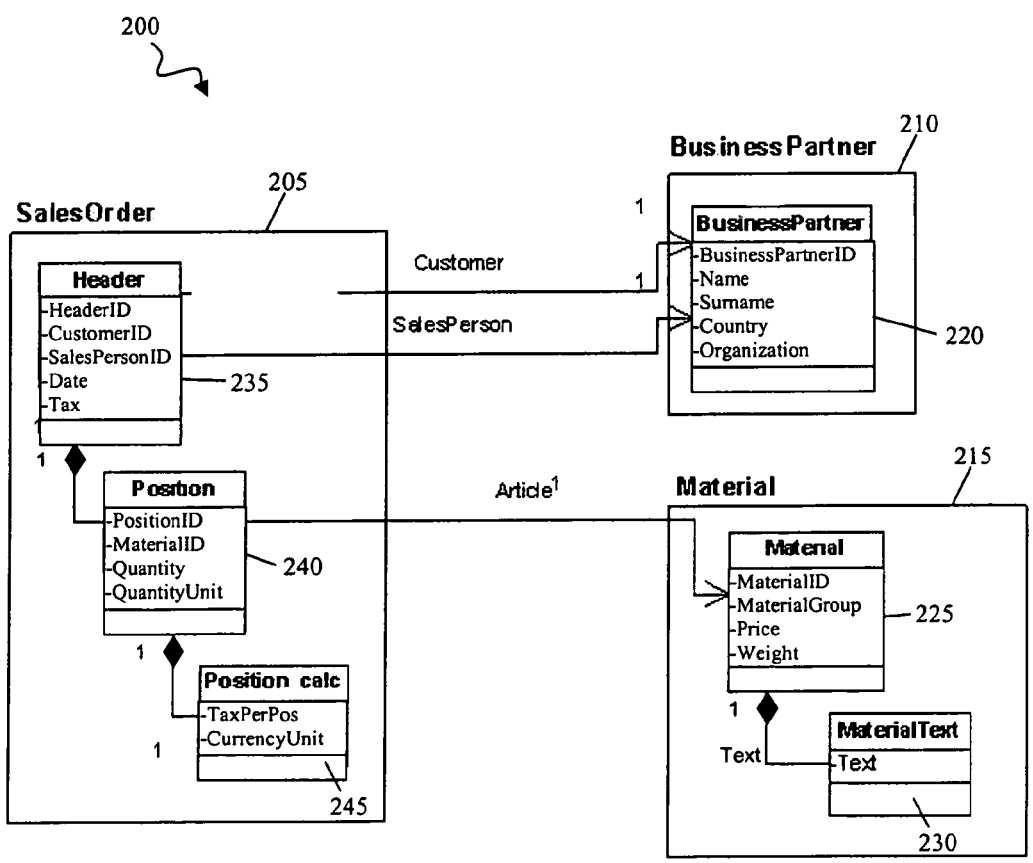
FIG. 2 is a class diagram of a business object model.

FIG. 2 is a class diagram of a transactional data model, namely a business object model 200. Business object model 200 can be received by a system performing process 100 at 105 (FIG. 1). Business object model 200 includes a sales order package 205, a business partner package 210, and a material package 215. Business partner package 210 can include a business partner object class 220. Business partner object class 220 has a business partner identity attribute, a name attribute, a surname attribute, a country attribute, and an organization attribute.

Material package 215 can include a material object class 225 and material text object classes 230. Material object class 225 has a material identity attribute, a material group attribute, a price attribute, and a weight attribute. Material text object class 230 has a text attribute. Each material object class 225 has a collection of zero or more associated material text object classes 230 in the role of "text."

Sales order package 205 can include a header object class 235, a position object class 240, and a position calculation object class 245. Header object class 235 has a header identity attribute, a customer identity attribute, a salesperson identity attribute, a date attribute, and a tax attribute. Header object class 235 is related to a first associated business partner object class 220 in the role of "customer" and to a second associated business partner object class 220 in the role of "salesperson." Header object class 235 also has a collection of zero or more associated position object classes 240.

Position object class 240 has a position identity attribute, a material identity attribute, a quantity attribute, and a quantity unit. Position object class 240 is related to one or more material object classes 225. Each position object class 240 also has an associated position calculation object class 245. Position calculation object class 245 has a taxperpos attribute and a currency unit attribute. Taxperpos attributes deal with the tax rate at a position.

FIG. 3 is a schematic representation of a business partner view 300. Business partner view 300 is tailored to present dimension data derived from business partner package 210 in business object model 200.

Business partner view 300 includes a collection of field headings 305, a collection of metadata 310 describing the relation of fields in business partner view 300 to dimension data derived from business partner package 210, as well as a collection of this dimension data 315. In this regard, business partner view 300 includes business partner identification information 320, name information 325, country information 330, and organization name information 335. Business partner view 300 can also include other information, such as information describing the data types in the illustrated fields (not shown).

The metadata in metadata collection 310 that is part of business partner identification information 320 identifies that the business partner identification field is related to the business partner identity attribute in business partner object class 220 in business partner package 210, as shown by the data "BusinessPartner/BusinessPartner/BusinessPartnerID." Similarly, the metadata in metadata collection 310 that is part of name information 325 identifies that the name field is related to the name attribute in business partner object class 220 in business partner package 210, as shown by the data "BusinessPartner/BusinessPartner/Name."

FIG. 4 is a schematic representation of a material view 400. Material view 400 is tailored to present dimension data derived from material package 215 in business object model 200.

Material view 400 includes a collection of field headings 405, a collection of metadata 410 describing the relation of fields in material view 400 to dimension data derived from material package 215, as well as a collection of this dimension data 415. In this regard, material view 400 includes material identification information 420, material group information 425, and price information 430. Material view 400 can also include other information, such as information describing the data types in the illustrated fields (not shown).

The metadata in metadata collection 410 that is part of material identification information 420 identifies that the material identification field is related to the material identity attribute in material object class 225 in material package 215, as shown by the data "Material/Material/MaterialID." Similarly, the metadata in metadata collection 410 that is part of material group information 425 identifies that the material group field is related to the material group attribute in material object class 225 in material package 215, as shown by the data "Material/Material/MaterialGroup."

FIG. 5 is a schematic representation of a sales order view 500. Sales order view 500 is tailored to present fact data derived from sales order package 205 in business object model 200.

Sales order view 500 includes a collection of field headings 505, a collection of metadata 510 describing the relation of fields in sales order view 500 to fact data derived from sales order package 205, as well as a collection of this fact data 515. In this regard, sales order view 500 includes header identification information 520, customer identification information 525, salesperson identification information 530, date information 535, position identification information 540, material identification information 545, quantity information 550, and tax per position information 555. Sales order view 500 can also include other information, such as information describing the data types in the illustrated fields (not shown).

The metadata in metadata collection 510 that is part of header identification information 520 identifies that the header identification field is related to the header identity attribute in header object class 235 in sales order package 205, as shown by the data "SalesOrder/Header/HeaderID." The metadata in metadata collection 510 need not all refer to the same object class. For example, the metadata in metadata collection 510 that is part of quantity information 550 identifies that the quantity field is related to the quantity attribute in position object class 240 in sales order package 205, as shown by the data "SalesOrder/Position/Quantity." As yet another example, the metadata in metadata collection 510 that is part of taxperposition information 555 identifies that the taxperposition field is related to the taxperposition attribute in position calculation object class 245 in sales order package 205, as shown by the data "SalesOrder/Position_calc/TaxPerPos."

Figure 6:
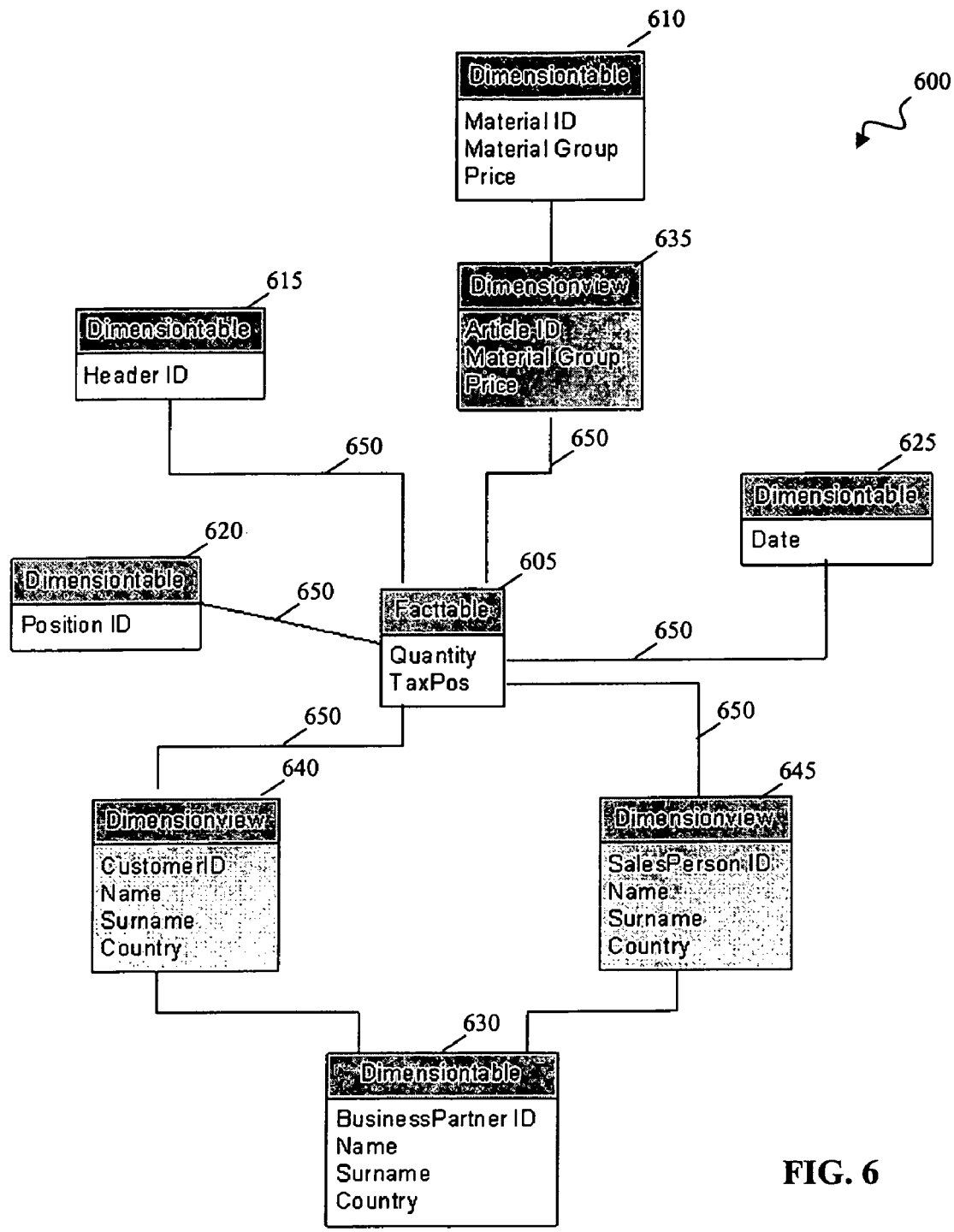
FIG. 6 is a schematic diagram of a reporting data model, namely a star schema.

FIG. 6 is a schematic diagram of a reporting data model, namely a star schema 600. Star schema 600 stores information for access by one or more data processing devices and/or data processing systems. The information in star schema 600 can concern a process of an enterprise such as a business.

Star schema 600 is a set of relational tables. In particular, star schema 600 includes a fact table 605, a collection of dimension tables 610, 615, 620, 625, 630, a collection of dimension views 635, 640, 645, and a collection of join paths 650. Fact table 605, dimension tables 610, 615, 620, 625, 630, and dimension views 635, 640, 645 are formed by assembling data warehouse objects. In some implementations, one or more of these data warehouse objects can reference transactional objects or the attributes or relationships of transactional objects.

Fact table 605 is a collection of measure objects that include measures (also known as "measurements," "metrics," "keyfigures," and/or "facts") organized into rows and columns. The measures in fact table 605 can set forth information about a collection of sales transactions and are typically numeric. For example, the measures in fact table 605 can include numeric data describing the quantity and the tax per position of the collection of sales transactions.

Dimension tables 610, 615, 620, 625, 630 are collections of one or more dimension objects that organize characteristics into rows and columns. These characteristics describe aspects of the measures in fact table 605. For example, dimension table 610 includes characteristics describing the material identifications, the material groups, and the prices of measures in fact table 605. Dimension table 615 includes a characteristic describing the header identifications of measures in fact table 605. Dimension table 620 includes a characteristic describing the position identifications of measures in fact table 605. Dimension table 625 includes a characteristic describing the dates of measures in fact table 605. Dimension table 630 includes characteristics describing the business partner identifications, names, surnames, and countries of measures in fact table 605.

Dimension views 635, 640, 645 point to other dimension objects and they inherit their properties and their data. For example, dimension view 635 can present data from dimension table 610 to allow dimension table 610 to play the role of "article" in star schema 600. As another example, dimension view 640 can present data from dimension table 630 to allow dimension table 630 to play the role of "customer" in star schema 600. As yet another example, dimension view 640 can present data from dimension table 630 to allow dimension table 630 to play the role of "salesperson" in star schema 600.

Join paths 650 indicate relationships between the measures in fact table 605, the characteristics in dimension tables 610, 615, 620, 625, 630, and dimension views 635, 640, 645. For example, join paths 650 can indicate that the dimensions 635, 615, 620, 640, 645, 625 are the primary keys of the measures in fact table 605.

Figure 7:
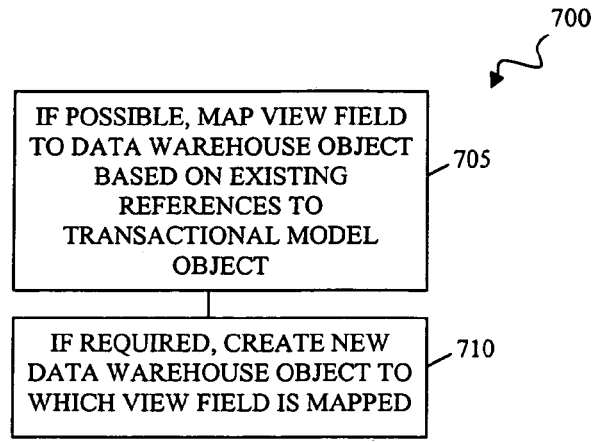
FIGS. 7-11 are flowcharts of processes for mapping of a transactional data model to a reporting data model.

FIG. 7 is flowchart of a process 700 for mapping of a transactional data model to a reporting data model. Process 700 can be performed alone or as part of a larger set of data processing activities. For example, process 700 can be performed at 110 in process 100 (FIG. 1).

The system that performs process 700 can, if possible, map individual fields of a view to individual data warehouse objects based on existing references to transactional objects at 705. As discussed above, both view fields and data warehouse objects can reference transactional objects. Such references can be used as the basis for mapping view fields to data warehouse objects.

The system that performs process 700 can also create new data warehouse objects to which view fields are mapped at 710. Such new data warehouse objects can be created when existing references to transactional objects from view fields and/or data warehouse objects are insufficient to allow the view fields to be mapped to data warehouse objects.

Figure 8:
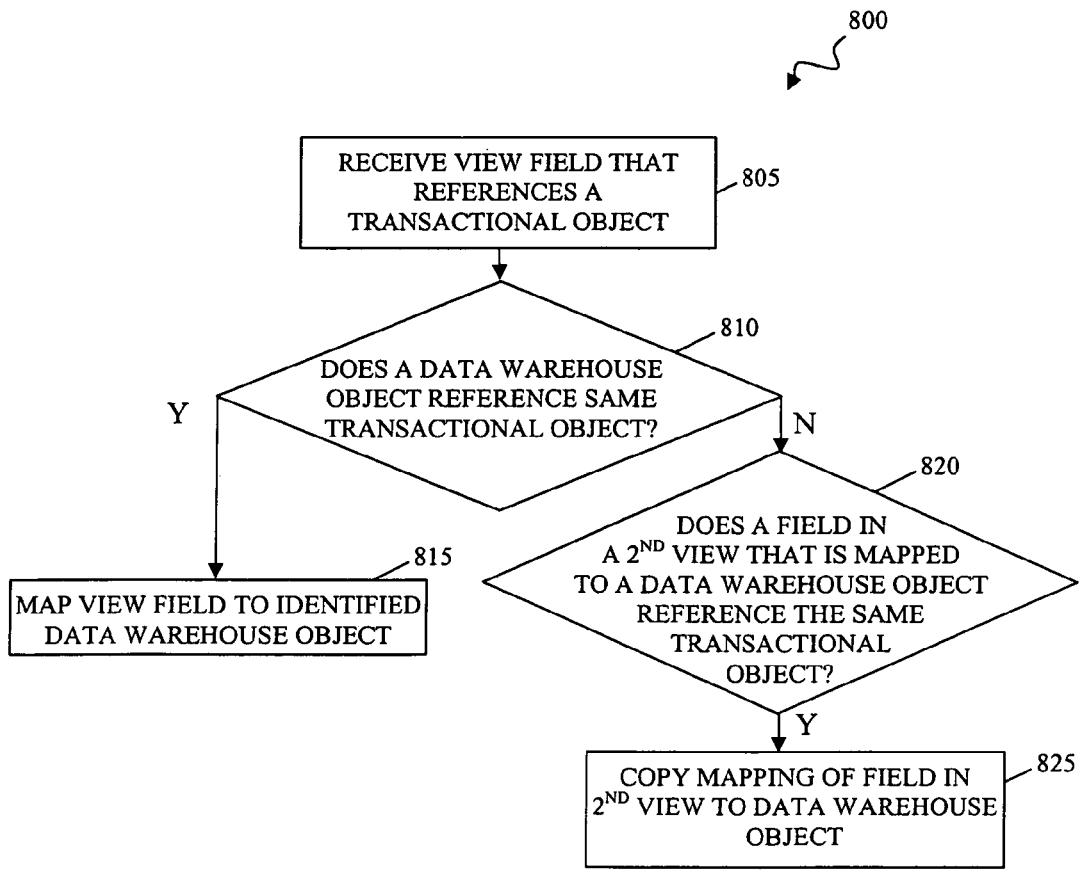

FIG. 8 is flowchart of a process 800 for mapping of a transactional data model to a reporting data model. Process 800 can be performed alone or as part of a larger set of data processing activities. For example, process 800 can be performed at 705 in process 700 (FIG. 7) to map individual fields of a view to individual data warehouse objects based on existing references to transactional objects.

The system that performs process 800 can receive a view field that references a transactional object at 805. The reference can identify a transactional object or an attribute, method, interface, or relationship of a transactional object from which information in the view field is derived. Such a reference can be, e.g., a name, a pointer, or other identifying information.

The system that performs process 800 can determine if a data warehouse object that references same transactional object as the received view field exists at 810. Such a data warehouse object can reference the same transactional object or the same attribute, the same method, the same interface, or the same relationship of the same transactional object, any of which is referred to hereinafter as "the same transactional object." If the system is able to identify a data warehouse object that references the same transactional object, then the system can map the view field to the identified data warehouse object at 810.

If the system is unable to identify such a data warehouse object, then the system can determine if it is possible to identify a field in a second view that both references the same transactional object as the received view field and is mapped to a data warehouse object at 815. The field in the second view can be mapped to a data warehouse object due to prior user input or other information, such as a prior performance of a process for mapping of a transactional data model to a reporting data model.

If the system is able to identify a field in a second view that both references the same transactional object and is mapped to a data warehouse object, then the system can copy the existing mapping of that field in the second view for the received view field at 825.

If the system is unable to identify a field in a second view that is both mapped to a data warehouse object references the same transactional object as the received view field, then the received view field remains unmapped to a data warehouse object after process 800.

Figure 9:
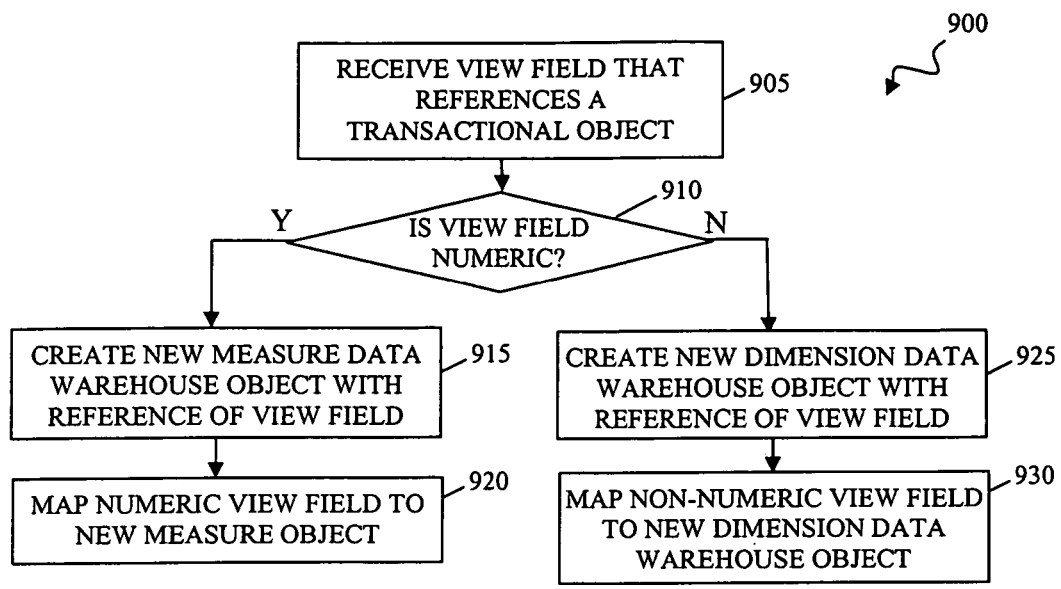

FIG. 9 is flowchart of a process 900 for mapping of a transactional data model to a reporting data model. Process 900 can be performed alone or as part of a larger set of data processing activities. For example, process 900 can be performed at 510 in process 500 (FIG. 5) to create new data warehouse objects to which view fields are mapped.

The system that performs process 900 can receive a view field that references a transactional object at 905. The reference can identify a transactional object or an attribute, method, interface, or relationship of a transactional object from which information in the view field is derived. Such a reference can be, e.g., a name, a pointer, or other identifying information.

The system that performs process 900 can determine if the data content of the view field is numeric at 910. Such a determination can be made, e.g., by examining the data type of the view field in meta data in the view.

If the system determines that the data content of the view field is numeric, the system can create a new measure data warehouse object at 915. The new measure object is provided with a reference to the same transactional object referenced by the numeric view field. The numeric view field can be mapped to the new measure object at 920.

If the system determines that the data content of the view field is not numeric, the system can create a new dimension data warehouse object at 925. The new dimension object is provided with a reference to the same transactional object referenced by the non-numeric view field. The non-numeric view field can be mapped to the new dimension object at 930.

Figure 10:
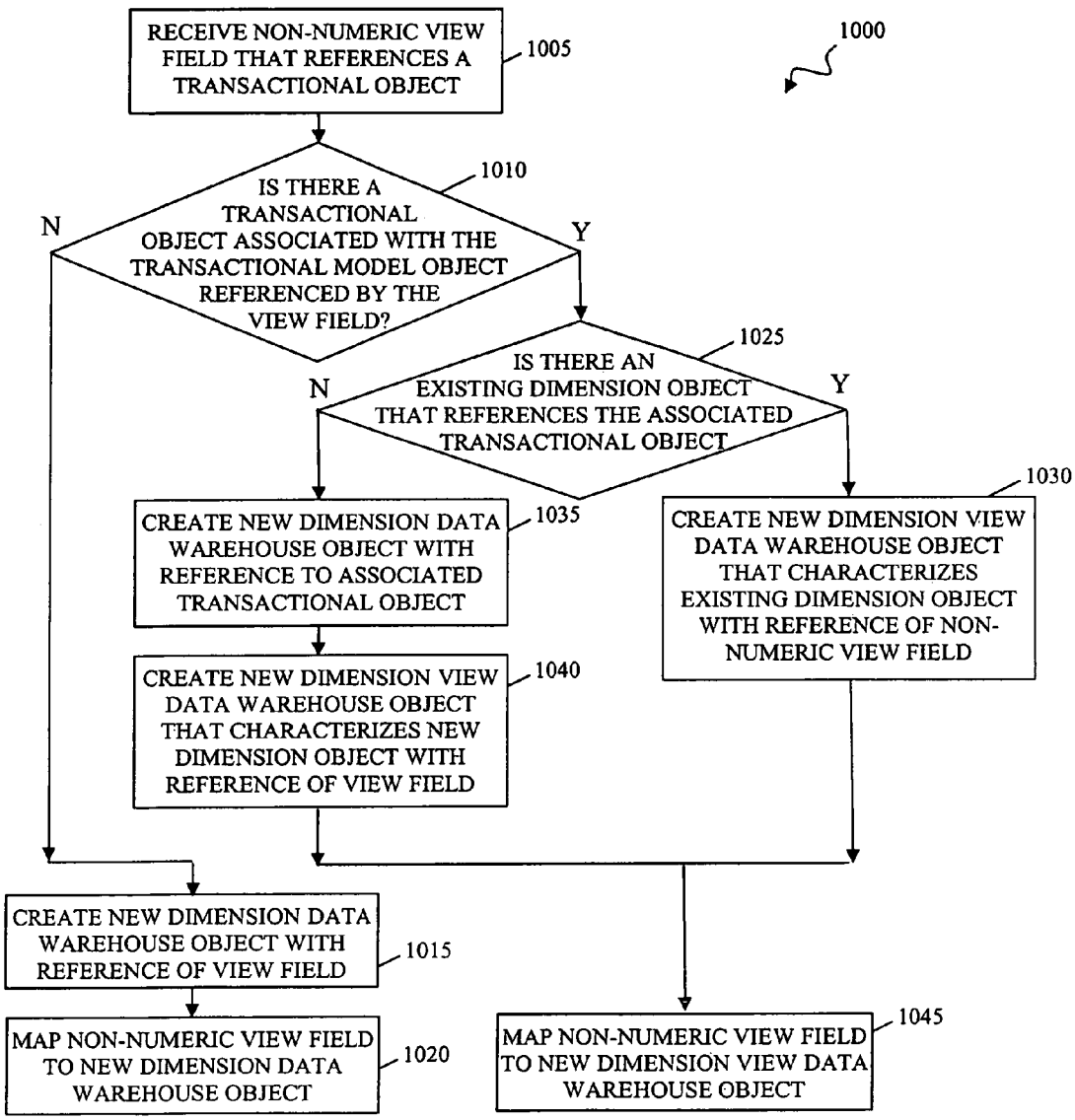

FIG. 10 is flowchart of a process 1000 for mapping of a transactional data model to a reporting data model. Process 1000 can be performed alone or as part of a larger set of data processing activities. For example, process 1000 can be performed at 710 in process 700 (FIG. 7) and/or at 925, 930 in process 900 (FIG. 9).

The system that performs process 1000 can receive a non-numeric view field that references a first transactional object at 1005. The system can determine if there is a second transactional object associated with the first transactional object referenced by the view field at 1010. Such associations between transactional objects can include associations, aggregations, and compositions.

If the system determines that no second transactional object is associated with the first transactional object referenced by the view field, then the system can create a new dimension data warehouse object at 1015. The new dimension object is provided with a reference to the same transactional object as that referenced by the view field. The non-numeric view field can be mapped to the new dimension object at 1020.

If the system determines that there is a second transactional object associated with the first transactional object referenced by the view field, then the system can determine if there is an existing dimension data warehouse object that references the second transactional object at 1025. If the system determines that there is such an existing dimension data warehouse, the system can create a new dimension view data warehouse object that is referenced by the non-numeric view field at 1030. This new dimension view object is to characterize the existing dimension object in a data warehouse. For example, when the data warehouse is a star schema, the new dimension view object will join the referenced dimension object to the fact table along a join path.

If the system determines that no existing dimension data warehouse object references the second transactional object, then the system can create a new dimension data warehouse object that references the second transactional object at 1035. The system can create a new dimension view data warehouse object that is referenced by the non-numeric view field at 1040. This new dimension view object is to characterize the new dimension object in a data warehouse. For example, when the data warehouse is a star schema, the new dimension view object will join the new dimension object to the fact table along a join path.

Regardless of whether the new dimension view characterizes an existing dimension object (i.e., the new dimension view was created at 1030) or the new dimension view characterizes a new dimension object (i.e., the new dimension view was created at 1040), the system maps the non-numeric view field to the new dimension view object at 1045.

Figure 11:
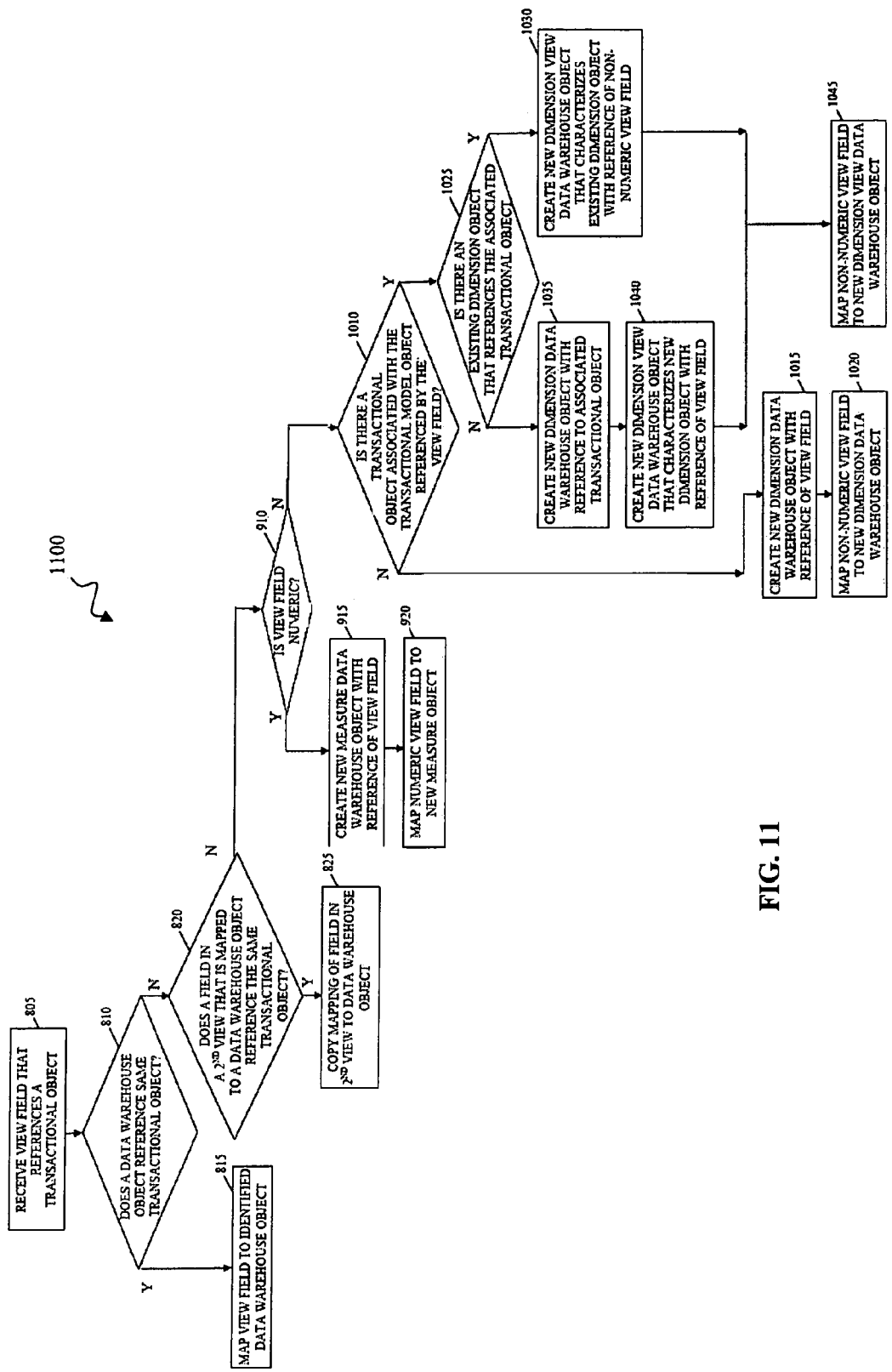

FIG. 11 is flowchart of a process 1100 for mapping of a transactional data model to a reporting data model. Process 1100 integrates elements of processes 800 (FIG. 8), 900 (FIG. 9), 1000 (FIG. 10) and uses the references numerals of elements therein. Process 900 can be performed repeatedly, for multiple fields in a view, so that every field in a view can be mapped to a reporting data model. For example, process 1100 can be performed repeatedly so that individual fields in a view are mapped to individual data warehouse objects at 110 in process 100 (FIG. 1).

For illustrative purposes, the performance of process 1100 on fields in views 300 (FIG. 3), 400 (FIG. 4), 500 (FIG. 5), which reference transactional objects in transactional data model 200 (FIG. 2), is now described. A potential output of this performance is reporting model 600 (FIG. 6). Process 1100 can be performed on the fields in views 300, 400, 500 in any order, as discussed herein.

As a first example, field heading 505 of header identification information 520, which references header object class 235 in business object model 200, can be received at 805. If, at 810, the system performing process 1100 is able to identify an existing data warehouse object (such as dimension table 615 before assembly into star schema 600) that that also references header object class 235, then the system can map header identification information 520 to that existing data warehouse object at 815 and move on to another view field.

As another example, field heading 505 of material identification information 545, which references material object class 225 in business object model 200, can be received at 805. If, at 810, the system performing process 1100 is unable to identify an existing data warehouse object that that also references material object class 225, then the system can seek to identify a field in a second view that references material object class 225. If, at 820, the system performing process 900 is able to identify a field in a second view that both references material object class 225 and is already mapped to a data warehouse object, then the system can copy the mapping of that field in a second view for position identification information 540 at 825 and move on to another view field. For example, if material identification information 420 in material view 400 already references material object class 225 and is mapped to a dimension table 610, the system can map material identification information 545 to dimension table 610 at 825.

As another example, field heading 505 of quantity information 550, which references the quantity attribute in position object class 240, can be received at 805. If, at 810, the system performing process 1100 is unable to identify an existing data warehouse object that that also references the quantity attribute in position object class 240, then the system can seek to identify a field in a second view that references the quantity attribute in position object class 240 at 820. If the system performing process 1100 is unable to identify a field in a second view that references the quantity attribute in position object class 240, then the system can determine if quantity information 550 is numeric at 910. After the system determines that quantity number information 550 is numeric, the system can create a new measure object (such as a column of quantity measures suitable for assembly into a fact table) at 915 and map quantity information 550 to the new measure object at 920. The system can move on to another view field in view 300.

As another example, field heading 505 of date information 535, which references the date attribute in header object class 235, can be received at 805. If, at 810, the system performing process 1100 is unable to identify an existing data warehouse object that that also references the date attribute in header object class 235, then the system can seek to identify a field in a second view that references the date attribute in header object class 235 at 820. If the system performing process 1100 is unable to identify a field in a second view that references the date attribute in header object class 235, then the system can determine if date information 535 is numeric at 910. After the system determines that date information 535 is not numeric, the system can determine if there is a transactional object associated with the date attribute in header object class 235 at 1010. Since no transactional objects are associated with the date attribute in header object class 235, the system can create a new dimension object (such as dimension table 625) at 1015 and map date field 325 to the new dimension object at 1020. The system can move on to another view field.

As another example, field heading 505 of customer identification information 525, which references a business partner object class 220 that is in the role "customer," can be received at 805. If, at 810, the system performing process 1100 is unable to identify an existing data warehouse object that that also references the business partner object class 220 in the role "customer," then the system can seek to identify a field in a second view that references the business partner object class 220 in the role "customer." If, at 820, the system performing process 1100 is unable to identify an existing data warehouse object that that also references the business partner object class 220 in the role "customer," then the system can determine if customer identification information 525 is numeric at 910. After the system determines that customer identification information 525 is not numeric, the system can determine if there is a transactional object associated with business partner object class 220 at 1010.

Since header object class 235 is related to, and hence associated with, business partner object class 220, the system can next seek to determine if there is an existing dimension object that references business partner object class 220 in the role "customer" at 1025. If the system determines that no existing dimension object references business partner object class 220 in the role "customer," the system can create a new dimension object (such as dimension table 630) at 1035 and a new dimension view object (such as dimension view 640) at 1040. The system can also map customer identification information 525 to the new dimension object at 1045 and move on to another view field.

As another example, field heading 505 of salesperson identification information 530, which references a business partner object class 220 in the role "salesperson," can be received at 805. If, at 810, the system performing process 1100 is unable to identify an existing data warehouse object that that also references the business partner object class 220 in the role "salesperson," then the system can seek to identify a field in a second view that references the business partner object class 220 in the role "salesperson." If, at 820, the system performing process 1100 is unable to identify an existing data warehouse object that that also references the business partner object class 220 in the role "salesperson," then the system can determine if salesperson identification information 530 is numeric at 910. After the system determines that salesperson identification information 530 is not numeric, the system can determine if there is a transactional object associated with business partner object class 220 at 1010. Since header object class 235 is related to, and hence associated with, business partner object class 220, the system can next seek to determine if there is an existing dimension object that references business partner object class 220 in the role "salesperson" at 1025. If the system determines that an existing dimension object references business partner object class 220 in the role "salesperson," the system can create a new dimension view object (such as dimension view 645) at 1030. The system can also map salesperson identification information 530 to the new dimension object at 1045 and move on to another view field.

Comparable operations can be performed on the other fields in views 300, 400, or 500 and the results of one or more performances of process 1100 can be applied to subsequent performances. For example, a system can initially perform process 1100 on the fields in view 300 and create a dimension table that includes characteristics describing a business partner. In a subsequent performance of process 1100, this dimension table can be reused as dimension table 630 in star schema 600.

Figure 12:
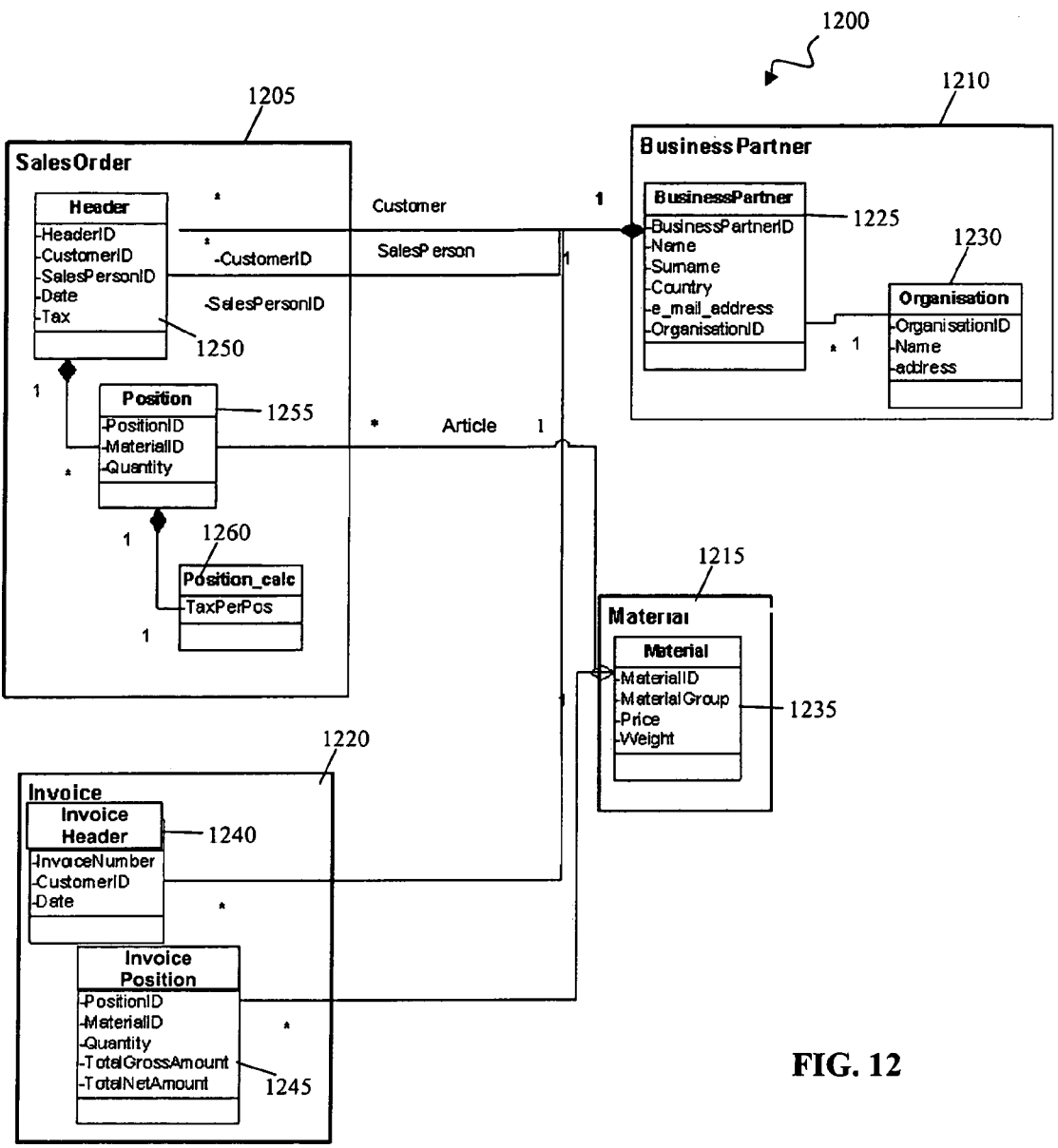
FIG. 12 is a class diagram of a business object model.

FIG. 12 is a class diagram of a transactional data model, namely a business object model 1200. Business object model 1200 can be an extension of model 200 (FIG. 2) or business object model 1200 can be independent of model 200. Business object model 1200 can be received by a system performing process 100 at 105 (FIG. 1). Business object model 1200 includes a sales order package 1205, two or more business partner packages 1210, one or more material packages 1215, and an invoice package 1220.

Business partner package 1210 can include a business partner object class 1225 and an organization object class 1230. Business partner object class 1225 has a business partner identity attribute, a name attribute, a surname attribute, a country attribute, an e-mail address attribute, and an organization identity attribute. Each business partner object class 1225 is related to one or more organization object class 1230. Organization object class 1230 has an organization identity attribute, a name attribute, and an address attribute.

Material package 1215 can include a material object class 1235. Material object class 1235 has a material identity attribute, a material group attribute, a price attribute, and a weight attribute. Material object class 1235 is related to zero or more invoice position object classes 1245.

Invoice package 1220 can include an invoice header object class 1240 and an invoice position object class 1245. Invoice header object class 1240 has an invoice number attribute, a customer identity attribute, and a date attribute. Invoice position object class 1245 has a position identity attribute, a material identity attribute, a quantity attribute, a total gross amount attribute, and a total net amount attribute.

Sales order package 1205 can include a header object class 1250, a position object class 1255, and a position calculation object class 1260. Header object class 1250 has a header identity attribute, a customer identity attribute, a salesperson identity attribute, a date attribute, and a tax attribute. Header object class 1250 has a first associated business partner object class 1225 in the role of "customer," a second associated business partner object class 1225 in the role of "salesperson," and is related to zero or more invoice header object classes 1240. Header object class 1250 also has a collection of zero or more associated position object classes 1255.

Position object class 1255 has a position identity attribute, a material identity attribute, and a quantity attribute. Position object class 1255 is related to one or more material object classes 1235. Each position object class 1255 also has an associated position calculation object class 1260. Position calculation object class 1260 has a taxperpos attribute.

FIG. 13 is a schematic representation of a business partner view 1300. Business partner view 1300 is tailored to present dimension data derived from business partner package 1010 in business object model 1200.

Business partner view 1300 includes a collection of field headings 1305, a collection of metadata 1310 describing the relation of fields in business partner view 1300 to dimension data derived from business partner package 1210, as well as a collection of this dimension data 1315. In this regard, business partner view 1300 includes business partner identification information 1320, name information 1325, country information 1330, and organization name information 1335. Business partner view 1300 can also include other information, such as information describing the data types in the illustrated fields (not shown).

The metadata in metadata collection 1310 that is part of business partner identification information 1320 identifies that the business partner identification field is related to the business partner identity attribute in business partner object class 1025 in business partner package 1210, as shown by the data "BusinessPartner/BusinessPartner/BusinessPartnerID." Similarly, the metadata in metadata collection 1310 that is part of name information 1325 identifies that the name field is related to the name attribute in business partner object class 1225 in business partner package 1210, as shown by the data "BusinessPartner/BusinessPartner/Name." The metadata in metadata collection 1310 need not all refer to the same object class. For example, the metadata in metadata collection 1310 that is part of organization name information 1335 identifies that the organization name field is related to the name attribute in organization object class 1230 in business partner package 1210, as shown by the data "BusinessPartner/Organisation/Name."

FIG. 14 is a schematic representation of a material view 1400. Material view 1400 is tailored to present dimension data derived from material package 1215 in business object model 1200.

Material view 1400 includes a collection of field headings 1405, a collection of metadata 1410 describing the relation of fields in material view 1400 to dimension data derived from business material package 1215, as well as a collection of this dimension data 1415. In this regard, material view 1400 includes material identification information 1420, material group information 1425, and price information 1430. Material view 1400 can also include other information, such as information describing the data types in the illustrated fields (not shown).

The metadata in metadata collection 1410 that is part of material identification information 1420 identifies that the material identification field is related to the material identity attribute in material object class 1235 in material package 1215, as shown by the data "Material/Material/MaterialID." Similarly, the metadata in metadata collection 1410 that is part of material group information 1425 identifies that the material group field is related to the material group attribute in material object class 1235 in material package 1215, as shown by the data "Material/Material/MaterialGroup."

FIG. 15 is a schematic representation of a sales order view 1500. Sales order view 1500 is tailored to present fact data derived from sales order package 1205 in business object model 1200.

Sales order view 1500 includes a collection of field headings 1505, a collection of metadata 1510 describing the relation of fields in sales order view 1500 to fact data derived from sales order package 1205, as well as a collection of this fact data 1515. In this regard, sales order view 1500 includes header identification information 1520, customer identification information 1525, salesperson identification information 1530, date information 1535, position identification information 1540, material identification information 1545, quantity information 1550, and tax per position information 1555. Sales order view 1500 can also include other information, such as information describing the data types in the illustrated fields (not shown).

The metadata in metadata collection 1510 that is part of header identification information 1520 identifies that the header identification field is related to the header identity attribute in header object class 1250 in sales order package 1205, as shown by the data "SalesOrder/Header/HeaderID." The metadata in metadata collection 1510 need not all refer to the same object class. For example, the metadata in metadata collection 1510 that is part of quantity information 1550 identifies that the quantity field is related to the quantity attribute in position object class 1255 in sales order package 1205, as shown by the data "SalesOrder/Position/Quantity." As yet another example, the metadata in metadata collection 1510 that is part of taxperposition information 1555 identifies that the taxperposition field is related to the taxperposition attribute in position calculation object class 1260 in sales order package 1205, as shown by the data "SalesOrder/Position_calc/TaxPerPos."

FIG. 16 is a schematic representation of an invoice view 1600. Invoice view 1600 is tailored to present fact data derived from invoice package 1220 in business object model 1200.

Invoice view 1600 includes a collection of field headings 1605, a collection of metadata 1610 describing the relation of fields in invoice view 1600 to fact data derived from invoice package 1220, as well as a collection of this fact data 1615. In this regard, invoice view 1600 includes invoice number information 1620, customer identification information 1625, date information 1630, position identification information 1635, material identification information 1640, quantity information 1645, total gross amount information 1650, and total net amount information 1655. Invoice view 1600 can also include other information, such as information describing the data types in the illustrated fields (not shown).

The metadata in metadata collection 1610 that is part of invoice number information 1620 identifies that the invoice number field is related to the invoice number attribute in invoice header object class 1240 in invoice package 1220, as shown by the data "Invoice/InvoiceHeader/Invoicenumber." The metadata in metadata collection 1610 need not all refer to the same object class. For example, the metadata in metadata collection 1610 that is part of position identification information 1635 identifies that the position identification field is related to the position identity attribute in invoice position object class 1245 in invoice package 1220, as shown by the data "Invoice/InvoicePosition/PositionID."

Figure 17:
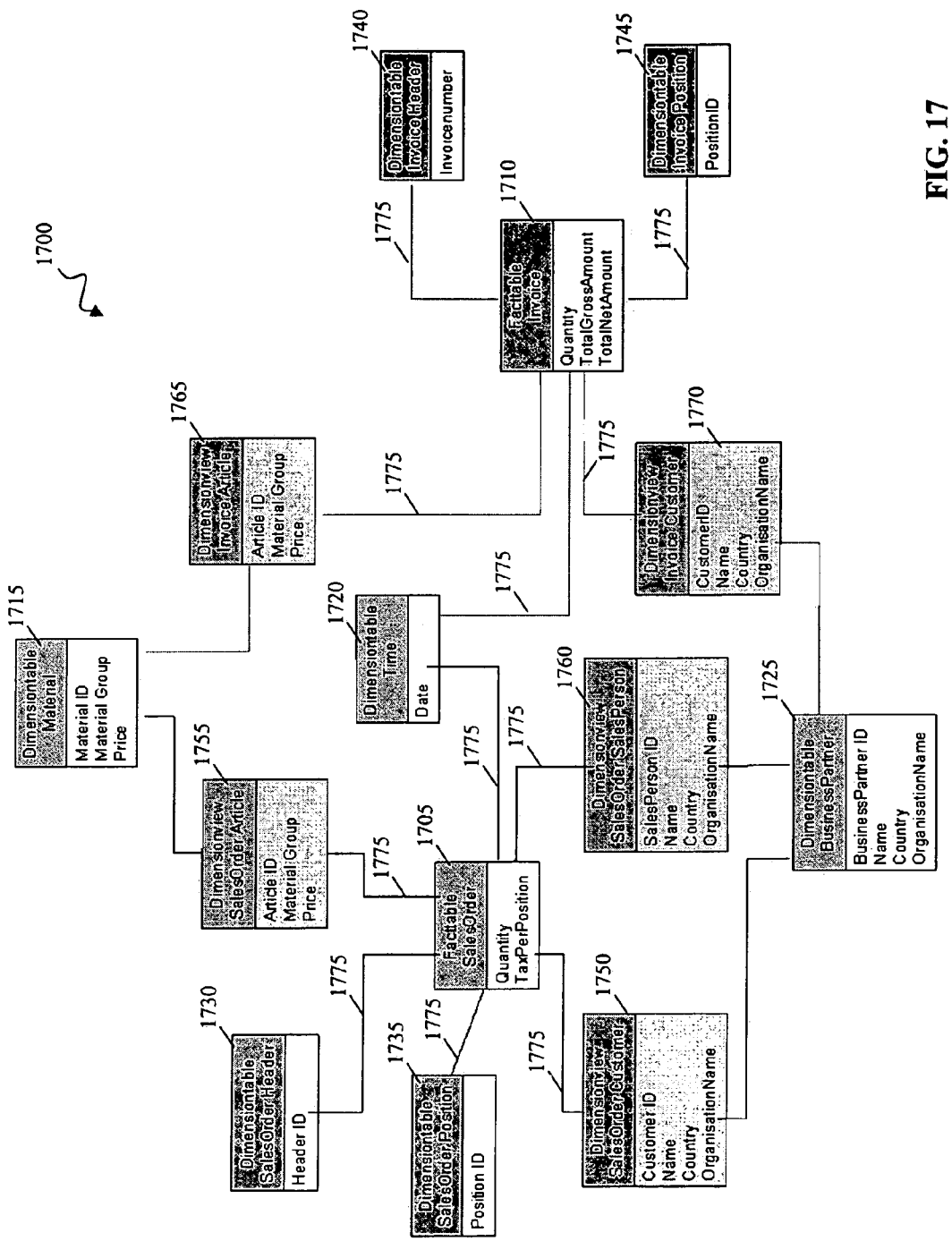
FIG. 17 is a schematic diagram of a reporting data model.

FIG. 17 is a schematic diagram of a reporting data model, namely a data warehouse 1700. Data warehouse 1700 is a set of relational tables. In particular, data warehouse 1700 includes a salesorder fact table 1705, an invoice fact table 1710, shared dimension tables 1715, 1720, 1725, dimension tables 1730, 1735, 1740, 1745, dimension views 1750, 1755, 1760, 1765, 1770, and a collection of join paths 1775. Fact tables 1705, 1710, dimension tables 1717, 1720, 1725, 1730, 1735, 1740, 1745, and dimension views 1750, 1755, 1760, 1765, 1770 are formed by assembling data warehouse objects.

The constituent data warehouse objects in data warehouse 1700 can be assembled using process 100 (FIG. 1). For example, process 1100 (FIG. 11) can be successively performed on the view fields of views 1300, 1400, 1500, 1600 (FIGS. 13-16) to map individual fields in those views to the data warehouse objects. Such data warehouse objects can be subsequently grouped to form fact tables 1705, 1710, dimension tables 1715, 1720, 1725, 1730, 1735, 1740, 1745, and dimension views 1750, 1755, 1760, 1765, 1770 in data warehouse 1700.

For example, when process 1100 is applied to business partner view 1300 (FIG. 13), fields in business partner view 1300 are mapped to corresponding dimension objects. These dimension objects can be grouped to form dimension table 1725.

As another example, when process 1100 is applied to material view 1400 (FIG. 14), fields in material view 1400 are mapped to corresponding dimension objects. These dimension objects can be grouped to form dimension table 1715.

As yet another example, when process 1100 is applied to sales order view 1500 (FIG. 15), fields in sales order view 1500 are mapped to a corresponding dimension objects or measure objects. For example, header identification 1520 is mapped to a dimension object used to form dimension table 1730, position identification information 1540 is mapped to a dimension object used to form dimension table 1735, and date information 1535 is mapped to a dimension object used to form dimension table 1720.

Moreover, aspects of the dimension objects that result from previous mappings can be reused when process 1100 is applied to sales order view 1500. For example, aspects of dimension tables 1715, 1725 (which are formed by mapping business partner view 1300 (FIG. 13) and material view 1400 (FIG. 14)) can be reused in mapping sales order view 1500. For example, salesperson identification information 1530 can be mapped to a dimension object used to form dimension view 1760 which references the dimension table 1725 and inherits all of the attributes of dimension table 1725, namely, "name," "country," and "organization name."

As another example, customer identification information 1525 is mapped to a dimension object used to form dimension view 1750 which references the dimension table 1725 and inherits all of the attributes of dimension table 1725, namely, "name," "country," and "organization name." As yet another example, material identification information 1545 is mapped to a dimension object used to form dimension view 1755 which references the dimension table 1715 and inherits all of the attributes of dimension table 1715, namely, "material group" and "price."

Quantity information 1550 and tax per position information 1555 are mapped to measure objects used to form salesorder fact table 1705.

As a still further example, when process 1100 is applied to invoice view 1600 (FIG. 16), each field in invoice view 1600 is mapped to a corresponding dimension object or measure object. For example, invoice number 1620 is mapped to a dimension object used to form dimension table 1740 and position identification information 1735 is mapped to a dimension object used to form dimension table 1745.

Customer identification information 1625 is mapped to a dimension object used to form dimension view 1770. Dimension view 1770 references the dimension table 1725 and inherits all of the attributes of dimension table 1725.

Material identification information 1640 is mapped to a dimension object used to form dimension view 1765. Dimension view 1765 references the dimension table 1715 and inherits all of the attributes of dimension table 1715.

Quantity information 1645, total gross amount information 1650, and total net amount information 1655 are mapped to measure objects used to form invoice fact table 1705. Date information 1630 can be mapped to dimension table 1720, which is reused.

Various implementations of the systems and techniques described here can be realized in digital electronic circuitry, integrated circuitry, specially designed ASICs (application specific integrated circuits), computer hardware, firmware, software, and/or combinations thereof These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

The computing environment can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Accordingly, other implementations are within the scope of the following claims.

What is claimed is:

1. An article comprising one or more machine-readable media storing instructions operable to cause one or more machines to perform operations comprising:

receiving a transactional data model and a view that comprises a plurality of view fields, each view field referencing a transactional object of a plurality of transactional objects in the transactional data model, the transactional data model being tailored to facilitate modification of the plurality of transactional objects, the view comprising at least a subset of the plurality of transaction objects assembled into a flat data structure;

mapping one or more view fields of the plurality of view fields to one or more of a plurality of data warehouse objects stored in a data warehouse comprising a star schema that comprises a plurality of measure objects assembled into a fact table and a plurality of dimension objects joined to the fact table as a dimension table, the mapping one or more of the plurality of view fields comprising mapping the one or more of the plurality of view fields based on existing references to objects in the transactional data model, the mapping one or more of the plurality of view fields further comprising one or more of:

creating, upon determining that first data content of a first view field of the plurality of view fields comprises a numeric value, a first new measure object in the transactional data model, the first new measure object storing one or more of: a first measurement, a first metric, and a first key figure, the creating comprising providing the first new measure object with a first reference to a first transactional object of the plurality of transactional objects in the transactional data model that is referenced by the first view field; mapping the first view field to the first new measure object; and adding the first new measure object to the fact table; and creating, upon determining that second data content of a second view field comprises a non-numeric value and that a second transactional object associated with the second view field in the transactional data model is referenced by at least one of the plurality of data warehouse objects, a second new dimension object, the second new dimension object referencing the at least one of the plurality of data warehouse objects and describing the second new measure object, the creating comprising providing the second new dimension object with a second reference to a second transactional object of the plurality of transactional objects in the transactional data model that is referenced by the second view field; mapping the second view field to the second new dimension object; and joining the second new dimension object to the fact table; the method further comprising:

grouping the data warehouse objects to which the one or more of the plurality of view fields, including the first or second new measure object and first or second new dimension object, are mapped into a reporting data model that facilitates analysis and/or reporting of data in the data warehouse.

2. The article of claim 1, wherein mapping the one or more view fields of the plurality of view fields further comprises: determining if an existing data warehouse object references the first or the second transactional object in the transactional data model, wherein the first or the second transactional object is also referenced by the view field; and mapping the view field to the existing data warehouse object.

3. The article of claim 1, wherein mapping each individual view field of the plurality of view fields comprises: determining if an other view field in an other view references a specific transactional object of the plurality of transactional objects in the transactional data model, wherein the specific transactional object is also referenced by the individual view field and the other view field is already mapped to an existing data warehouse object; and mapping the individual view field to the existing data warehouse object.

4. The article of claim 1, wherein: the transactional data model comprises a collection of objects that are comparably sized to common change transactions.

5. The article of claim 1, wherein the first measurement describes a quantity.

6. The article of claim 1, wherein, if no additional transactional object is associated in the transactional data model with the transactional object referenced by the view field, creating a new dimension view data warehouse object referenced by the view field, the new dimension view data warehouse object characterizing the new dimension object in the data warehouse by joining the new dimension object to a fact table in the data warehouse along a join path.

7. A method executable on at least one processor and a memory, the method comprising:

receiving a transactional data model and a view that comprises a plurality of view fields, each view field referencing a transactional object of a plurality of transactional objects in the transactional data model, the transactional data model being tailored to facilitate modification of the plurality of transactional objects, the view comprising at least a subset of the plurality of transaction objects assembled into a flat data structure;

mapping one or more view fields of the plurality of view fields to one or more of a plurality of data warehouse objects stored in a data warehouse comprising a star schema that comprises a plurality of measure objects assembled into a fact table and a plurality of dimension objects joined to the fact table as a dimension table, the mapping one or more of the plurality of view fields comprising mapping the one or more of the plurality of view fields based on existing references to objects in the transactional data model, the mapping one or more of the plurality of view fields further comprising one or more of:

creating, upon determining that first data content of a first view field of the plurality of view fields comprises a numeric value, a first new measure object in the transactional data model, the first new measure object storing one or more of a first measurement, a first metric, and a first key figure, the creating comprising providing the first new measure object with a first reference to a first transactional object of the plurality of transactional objects in the transactional data model that is referenced by the first view field; mapping the first view field to the first new measure object; and adding the first new measure object to the fact table; and creating, upon determining that second data content of a second view field comprises a non-numeric value and that a second transactional object associated with the second view field in the transactional data model is referenced by at least one of the plurality of data warehouse objects, a second new dimension object, the second new dimension object referencing the at least one of the plurality of data warehouse objects and describing the second new measure object, the creating comprising providing the second new dimension object with a second reference to a second transactional object of the plurality of transactional objects in the transactional data model that is referenced by the second view field; mapping the second view field to the second new dimension object; and joining the second new dimension object to the fact table; the method further comprising:

grouping the data warehouse objects to which the one or more of the plurality of view fields, including the first or second new measure object and first or second new dimension object, are mapped into a reporting data model that facilitates analysis and/or reporting of data in the data warehouse.

8. The method of claim 7, further comprising identifying a relationship between a specific measure object of the plurality of measure objects and a specific dimension object of the plurality of dimension objects in the data warehouse with a dimension view object.

9. The method of claim 7, wherein creating the first or the second new dimension view object further comprises determining whether an existing dimension object in the data warehouse references the first or the second transactional object, respectively.

10. The method of claim 9, further comprising responding to a determination that the existing dimension object references the first or the second transactional object by creating a new dimension view object to characterize the existing dimension object.

11. The method of claim 9, further comprising responding to a determination that no existing dimension object references the first or the second transactional object by: creating the first or the second new dimension object with a reference to the first or the second transactional object, respectively; and creating a new dimension view object to characterize the first or the second new dimension object.

12. The method of claim 7, further comprising selecting an additional view field from the collection, the additional view field referencing an additional transactional object of the plurality of transactional objects in the transactional data model.

13. The method of claim 7, wherein the view field references one of an attribute, a method, an interface, and a relationship of a given transactional object of the plurality of transactional objects.

14. The method of claim 7, wherein the view field comprises a numeric field.

15. A system comprising:

at least one processor; and at least one memory storing instructions that, when executed by the at least one processor, result in operations comprising:

receiving a transactional data model and a view that comprises a plurality of view fields, each view field referencing a transactional object of a plurality of transactional objects in the transactional data model, the transactional data model being tailored to facilitate modification of the plurality of transactional objects, the view comprising at least a subset of the plurality of transaction objects assembled into a flat data structure;

mapping one or more view fields of the plurality of view fields to one or more of a plurality of data warehouse objects stored in a data warehouse comprising a star schema that comprises a plurality of measure objects assembled into a fact table and a plurality of dimension objects joined to the fact table as a dimension table, the mapping one or more of the plurality of view fields comprising mapping the one or more of the plurality of view fields based on existing references to objects in the transactional data model, the mapping one or more of the plurality of view fields further comprising one or more of:

creating, upon determining that first data content of a first view field of the plurality of view fields comprises a numeric value, a first new measure object in the transactional data model, the first new measure object storing one or more of a first measurement, a first metric, and a first key figure, the creating comprising providing the first new measure object with a first reference to a first transactional object of the plurality of transactional objects in the transactional data model that is referenced by the first view field; mapping the first view field to the first new measure object; and adding the first new measure object to the fact table; and creating, upon determining that second data content of a second view field comprises a non-numeric value and that a second transactional object associated with the second view field in the transactional data model is referenced by at least one of the plurality of data warehouse objects, a second new dimension object, the second new dimension object referencing the at least one of the plurality of data warehouse objects and describing the second new measure object, the creating comprising providing the second new dimension object with a second reference to a second transactional object of the plurality of transactional objects in the transactional data model that is referenced by the second view field; mapping the second view field to the second new dimension object; and joining the second new dimension object to the fact table; the method further comprising:

grouping the data warehouse objects to which the one or more of the plurality of view fields, including the first or second new measure object and first or second new dimension object, are mapped into a reporting data model that facilitates analysis and/or reporting of data in the data warehouse.

* * * * *